United States Patent
Andeen et al.

[11] 3,787,764
[45] Jan. 22, 1974

[54] SOLID DIELECTRIC CAPACITANCE GAUGE FOR MEASURING FLUID PRESSURE HAVING TEMPERATURE COMPENSATION AND GUARD ELECTRODE

[75] Inventors: Carl G. Andeen, Euclid, Ohio; John J. Fontanella, Annapolis, Md.; Donald E. Schuele, Columbus, Ohio

[73] Assignee: The United States of America as represented by the United States Atomic Energy Commission, Washington, D.C.

[22] Filed: Dec. 3, 1971

[21] Appl. No.: 204,578

[52] U.S. Cl. ............ 324/61 P, 73/398 C, 317/246
[51] Int. Cl. .................................... G01r 27/26
[58] Field of Search ........ 324/61 R, 61 P; 73/304 C, 73/398 C, 317/246, 258

[56] References Cited
UNITED STATES PATENTS

| | | | |
|---|---|---|---|
| 2,614,416 | 10/1952 | Hollmann | 317/258 X |
| 2,725,548 | 11/1955 | Harris | 317/246 UX |
| 2,924,970 | 2/1960 | Samsel et al. | 317/246 X |
| 3,715,638 | 2/1973 | Polye | 317/246 X |
| 2,904,732 | 9/1959 | Houghton | 73/304 C X |
| 3,478,589 | 11/1969 | Birken | 324/61 R X |
| 3,678,378 | 7/1972 | Trott et al. | 324/61 R |
| 3,529,238 | 9/1970 | Fiet | 324/61 R |
| 3,611,178 | 10/1971 | McConnell | 324/61 R X |
| 3,473,096 | 10/1969 | Johnson et al. | 73/398 C X |

Primary Examiner—Stanley T. Krawczewicz
Attorney, Agent, or Firm—Roland A. Anderson; John A. Horan; Donald P. Reynolds

[57] ABSTRACT

Pressure in a fluid is measured by measuring the dielectric constant of a solid dielectric disposed in the fluid. Two electrodes are each mounted on an opposing side of the dielectric and the capacitance therebetween monitored to provide a measure of the dielectric constant of the dielectric material and hence pressure in the fluid.

4 Claims, 5 Drawing Figures

SOLID DIELECTRIC CAPACITANCE GAUGE FOR MEASURING FLUID PRESSURE HAVING TEMPERATURE COMPENSATION AND GUARD ELECTRODE

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to the measurement of fluid pressure, and more particularly to measuring pressure in an electrically non-conductive fluid.

In order to measure fluid pressure accurately from atmospheric pressure to and beyond 35,000 psi, it is common to use either a dead-weight gauge or a manganin wire resistance gauge. Dead-weight gauges provide an accuracy of the order of 0.01 percent over such a range of pressures but embody a number of disadvantages. Dead-weight gauges are expensive to purchase and operate, are bulky and require considerable time to make measurements. Manganin wire resistance gauges also present difficulties when accurate measurements are to be made over a wide range of pressures. In particular, cycling in temperature or pressure or both affect the pressure coefficient of resistance in manganin wire resistance gauges. This leads to a lack of repeatability of measurements which is a severe disadvantage of manganin wire resistance gauges. Two other problems complicate operation of the manganin wire resistant gauge. The first is the so-called Bridgman water kick. This is an anomalous indication at low pressures due to electrical leakage from the manganin wire to ground resulting from water contamination in the pressure medium. A second undesirable attribute of manganin wire resistance gauges is delay in measurement due to an intrinsic time constant associated with the manganin wire.

It is an object of the present invention to provide a better method and means of measuring pressure in a fluid.

It is a further object of the present invention to provide a method and means for measuring fluid pressure that are inexpensive.

It is a further object of the present invention to provide a method and means for measuring pressure accurately and repeatably.

It is a further object of the present invention to provide a method and means for measuring pressure having improved electrical leakage characteristics compared to manganin wire resistance gauges and therefore independent of the Bridgman water kick.

It is a further object of the present invention to provide a method and means for measuring pressure with a time constant that is negligible in comparison with ordinary pressure-measuring times.

It is a further object of the present invention to provide a method and means for making accurate measurements of fluid pressures to and including a pressure of 35,000 psi.

It is a further object of the present invention to provide a method and means for making fast inexpensive repeatable accurate measurements of high fluid pressures.

Other objects of the present invention will become more apparent as the detailed description proceeds.

SUMMARY OF THE INVENTION

The foregoing objects are achieved by placing a solid dielectric material in an electrically nonconductive fluid whose pressure is to be measured, and measuring the dielectric constant of the material resulting from pressure in the fluid.

DETAILED DESCRIPTION OF THE INVENTION

Figure 1:
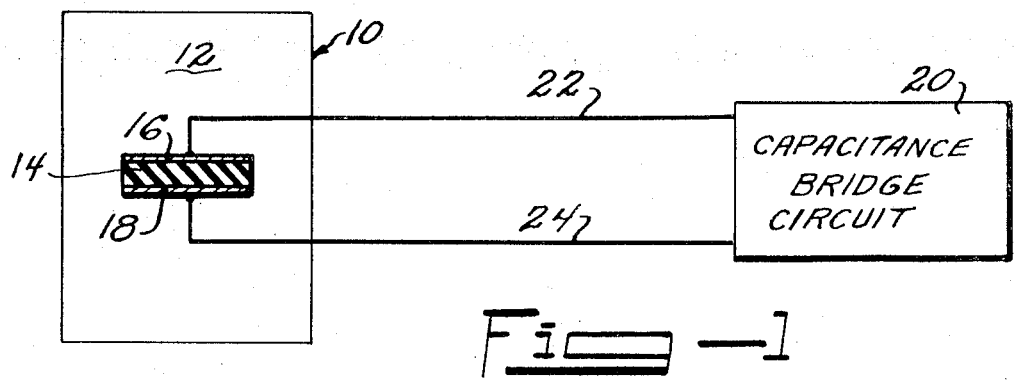
FIG. 1 is a block diagram indicating a general apparatus for the practice of the present invention.

In FIG. 1 a container 10 defines an electrically nonconductive fluid 12 whose pressure is to be measured. A solid dielectric material 14 is disposed within the fluid 12 so as to be in engagement therewith and subject to the pressure thereof. A pair of electrodes 16 and 18 are mounted on opposing sides of the dielectric material 14 in intimate physical contact therewith. A conventional capacitance measuring bridge circuit 20 is connected to electrodes 16 and 18 via conductors 22 and 24, respectively.

In operation, the fluid 12 in container 10 exerts a pressure on the solid dielectric material 14. The dielectric constant of the solid dielectric material 14 has been found to be responsive to the pressure from the fluid 12. Thus, the value of the dielectric constant of the solid dielectric material is a measure of the pressure of the fluid 12 on the dielectric material 14 and as the value of this pressure changes the value of the dielectric constant of the material 14 changes. The electrodes 16 and 18 mounted on opposing sides of dielectric material 14 in intimate contact therewith form with the material 14 a capacitor. The value of the dielectric constant of the solid dielectric material is determinative of the capacitance between the electrodes 16 and 18 and changes in the dilectric constant of the material 14 cause a change in this capacitance. The value of capacitance between the electrodes 16 and 18 and changes in such value are measured using the conventional capacitance measuring bridge circuit 20. Thus, the capacitance bridge circuit 20 provides a measure of capacitance between the electrodes 16 and 18 and hence a measure of the dielectric constant value of the dielectric material 14 therebetween, which dielectric constant value is a measure of the fluid pressure from fluid 12.

It is to be appreciated that for the practice of the present invention it is requisite that the dielectric material 14 be a solid dielectric material. Further, it is desirable that the electrodes 16 and 18 be thin-film electrodes which are in intimate physical contact with the dielectric material 14. Any solid dielectric material is satisfactory for the practice of the present invention and any electrically conductive material may be used for the electrodes 16 and 18. The fluid 12 may be a gas or a liquid but must be electrically nonconductive to permit the measurement of the dielectric constant of the material 14.

Figure 2:
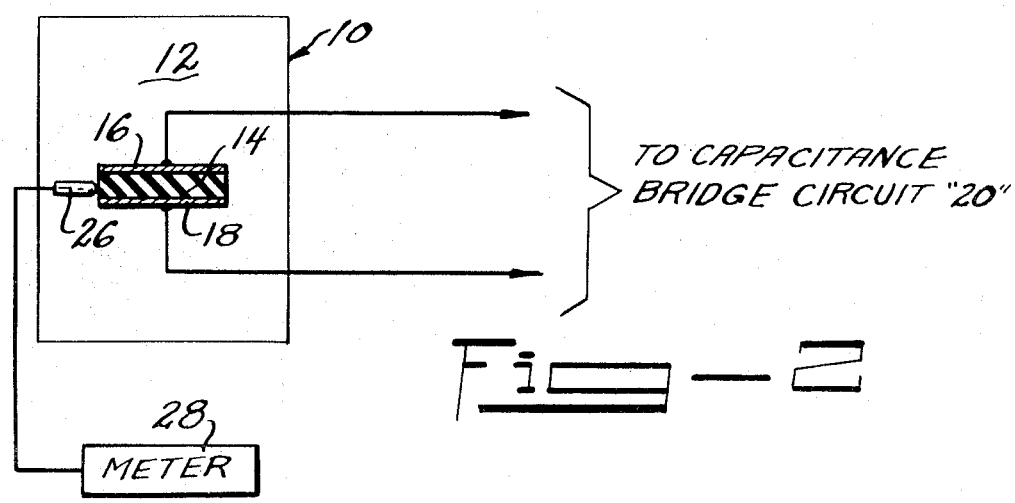
FIG. 2 is a block diagram of a temperature sensor coupled to the dielectric material of FIG. 1.
Figure 3:
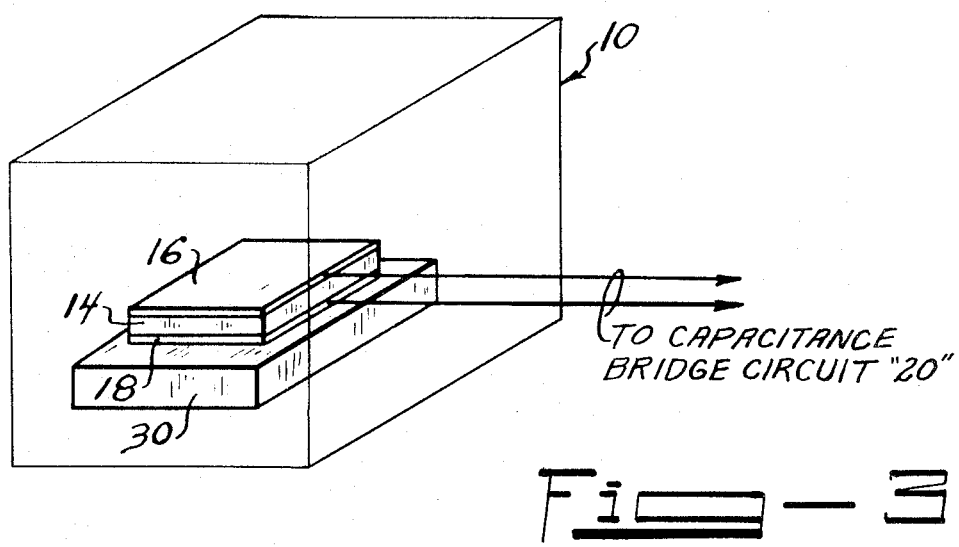
FIG. 3 is a block diagram showing a heat sink coupled to the dielectric material of FIG. 2.

As previously stated, it has been found that the dielectric constant of the dielectric material 14 is a measure of the pressure of the fluid 12 to which the dielectric material is exposed. It will be further appreciated that the dielectric material 14 may exhibit a dielectric constant which is temperature-dependent. To optimize accuracy of the measured pressure for fluid 12, it is thus desired to compensate for dielectric constant values of the material 14 due to he temperature of the material 14. This may be accomplished in several different ways. As shown in FIG. 2, a temperature sensor 26 (such as a glass-encapsulated thermistor) may be attached to the dielectric material to sense the temperature thereof, the output of the sensor being read by a meter 28. Known the temperature-response relationship of the dielectric constant of the solid dielectric material 14, one may use the measured temperature of the material 14 to compensate therefor. Conversely, to eliminate the temperature effects on the dielectric constant of the material 14, the material 14 may be thermally attached via electrode 18 to a heat sink 30 in the fluid 12, whereby the temperature of the material 14 is maintained at a constant value. The heat sink 30 may also comprise the structure of the container 10. Thus, the dielectric constant value being measured is independent of temperature and is a direct function of the pressure exerted by the fluid 12 on the dielectric material 14.

With the structure illustrated in FIG. 1, wherein two electrodes 16 and 18 are mounted in intimate contact with and on opposing sides of solid dielectric material 14, these exists the possibility of fringing electrostatic fields between the electrodes 16 and 18. Since it is desired for the practice of the present invention in measureing interelectrode capacitance between the electrodes 16 and 18 that the electrostatic fields therebetween be uniform and parallel, it is preferred for the practice of the present invention that a guard electrode be constructed to eliminate fringing electric fields and maintain uniformity of the fields between the electrodes 16 and 18. This structure is illustrated in FIGS. 4 and 5.

Figure 4:
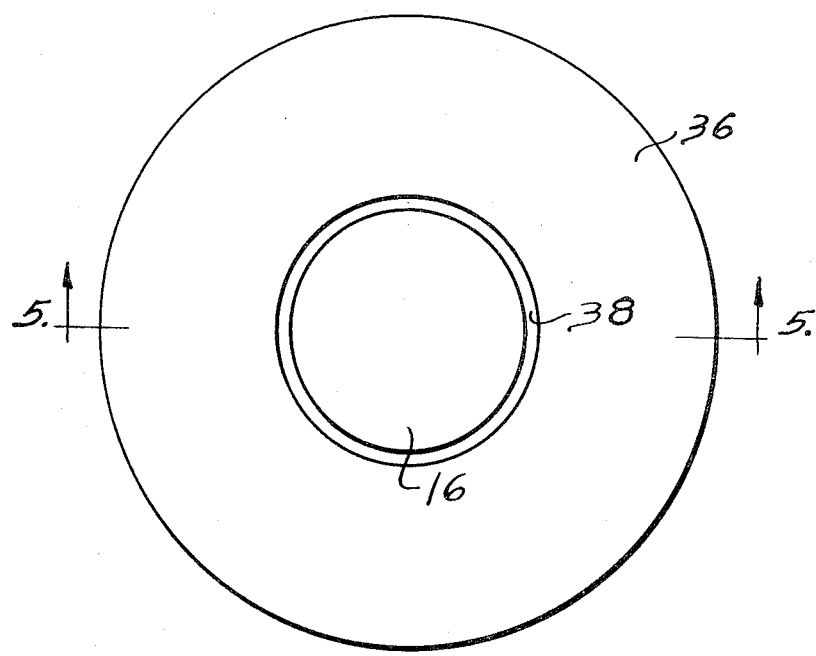
FIG. 4 is an alternate embodiment of the dielectric material of FIG. 1 constructed with a guard electrode.
Figure 5:
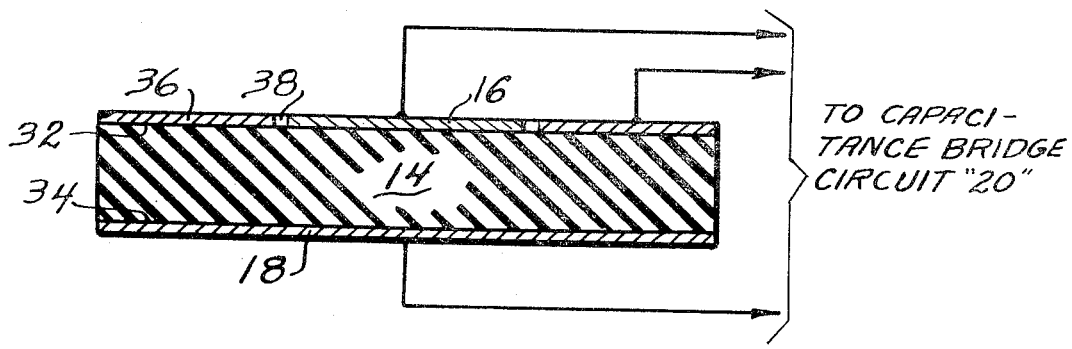
FIG. 5 is a section view of FIG. 4 along lines 5—5.

For the apparatus of FIGS. 4 and 5, the solid dielectric material 14 is illustrated as a circular wafer. It is to be appreciated that the present invention is not limited to such structural shape and that other shapes may be used therefor. The solid dielectric material 14 has opposing sides 32 and 34 formed so that they are parallel with respect to each other. The electrode 16 is formed as a circular electrode and mounted in intimate physical contact with side 32. The mounting of electrode 16 to the side 32 may be effected by conventional techniques such as vapor deposition or sputtering. The electrode 18 is mounted in intimate physical contact with the side 34 of solid dielectric material 14 using a similar conventional mounting technique as for electrode 16. The electrode 18 is also a circular electrode. It will be noted that the electrode 18 is larger in diameter than the electrode 16 and that the electrode 16 covers only a portion of the surface of side 32 of solid dielectric material 14. A third electrode 36 is mounted in intimate physical contact to the side 32 of solid dielectric material 14. The electrode 36 surrounds the electrode 16 but is spatially separated therefrom by a gap 38. The mounting of electrode 36 is effected in a similar manner as for electrodes 16 and 18. The electrode 36 forms a guard-ring electrode. The three electrodes 16, 18 and 36 are connected to the capacitance bridge measuring circuit 20 which, when used with a guard ring 36, is a conventional three-terminal-type capacitance bridge circuit.

With the electrode structure of FIGS. 4 and 5 disposed about the solid dielectric material 14, uniform parallel electrostatic field lines are formed between the electrodes 16 and 18, thereby improving the accuracy of the capacitance measured and hence the accuracy of determination of the dielectric constant of the material 14 and the pressure of the fluid 12.

An ionic crystal of calcium fluoride ($CaF_2$) was used as the solid dielectric material 14 illustrated in the embodiment of FIGS. 4 and 5. The calcium fluoride crystal was formed to have two parallel sides and a flat circular shape 25 mm in diameter and 1.6 mm in thickness. The electrodes 16, 18 and 36 were formed from aluminum and were vapor deposited on the opposing flat surfaces of the calcium fluoride crystal to a thickness of approximately 2,000 angstroms. To eliminate fringing electric fields, the gap 38 between the guard-ring electrode 36 and circular electrode 16 was made as small as possible (approximately 12 microns) and the guard electrode 36 had an internal diameter of 14 mm. Both the guard electrode and the electrode 18 extended to the edges of the dielectric material 14. Thus, the width of the guard electrode 36 (5.5 mm) when divided by the thickness of the dielectric material 14 (1.6 mm) was greater than 3, which relationship insured that fringing field effects were eliminated for the capacitor formed by the electrodes and the dielectric material.

The calcium fluoride crystal forming the solid dielectric material 14 had a temperature coefficient of capacitance (that is, the effect of temperature on its dielectric constant) of approximately 250 parts per million per degree Kelvin at room temperature. To eliminate temperature-induced errors in the capacitance measurement, the container 10 was thermally connected to the calcium fluoride crystal material 14 so that the container 10 acted as a thermal heat sink for the calcium fluoride material 14, whereby a temperature control of 0.01° C. was effected. A glass-encapsulated thermistor was connected to a sensing meter to monitor the temperature of the dielectric material 14. The three-terminal capacitance measuring bridge circuit 20 was operated at 2,005 hertz and the ratios read from the instrument were accurate to approximately 1 part in 10 million.

The dielectric material was immersed in and subjected to the fluid whose pressure was to be measured and the pressure of the fluid was varied between atmospheric and 35,000 psi. A standard dead-weight gauge accurate to 60 parts per million was also coupled to the fluid. As the pressure of the fluid was varied, the pressure measurements of the dead-weight gauge were compared against those using the dielectric material structure according to the present invention. Correlation between the two sets of measurements was obtained whereby the present invention exhibited a pressure measurement accuracy of one part in ten thousand.

Persons skilled in the art will, of course, readily adapt the general teachings of the present invention to embodiments far different than the embodiments illustrated. Accordingly, the scope of the protection afforded the present invention should not be limited to the particular embodiments illustrated in the drawings and described above, but should be determined only in accordance with the appended claims.

We claim:

1. A method of measuring pressures up to 35,000 p.s.i. in a fluid comprising the following steps:
   a. disposing a crystal of calcium fluoride entirely in said fluid;
   b. mounting a first electrode on a first side of said crystal in intimate physical engagement therewith;
   c. mounting a second electrode on said first side of said crystal in intimate physical engagement therewith, surrounding said first electrode and insulated electrically therefrom to comprise a guard ring;
   d. mounting a third electrode on a second side of said crystal opposite to said first side and in intimate physical engagement with said second side, the combination of said first, second, and third electrodes and said crystal constituting a guard-ring capacitor;
   e. maintaining the temperature of said crystal at a relatively constant value;
   f. measuring the capacitances between said first and third and said second and third electrodes at said maintained temperature; and
   g. subtracting measured capacitances to determine the capacitance between said first and third electrodes, which capacitance is a measure of the dielectric constant and hence of the pressure in said fluid.

2. An apparatus for measuring pressure in a fluid comprising:
   a solid dielectric material disposed entirely in said fluid and subject to the pressure thereof;
   a first electrode mounted on one side of said solid dielectric material in intimate physical engagement therewith;
   a second electrode mounted on the side of said solid dielectric material opposite to said first electrode in intimate physical engagement with said solid dielectric material;
   guard electrode means cooperatively disposed to inhibit fringing electric fields between said first and second electrodes; and
   three-terminal-capacitance-measuring means connected electrically to said first and second electrodes and to said guard electrode means for measuring the capacitance between said first and second electrodes, which capacitance is a measure of the dielectric constant of said solid dielectric material and hence the pressure of said fluid.

3. The apparatus according to claim 2 further including means for maintaining said dielectric material at a constant temperature.

4. The apparatus according to claim 3 wherein said first electrode comprises a thin-film electrode in intimate physical contact with said one side of said electrode, said second electrode comprises a thin-film electrode smaller in operable surface area than said first electrode and in intimate physical contact with said opposite side of said dielectric material, said guard electrode means include a third thin-film electrode disposed about said second electrode electrically insulated therefrom in intimate physical contact with said dielectric material, and said constant temperature means comprise a heat sink thermally coupled to said dielectric material.

* * * * *